June 7, 1938.  M. D. COULTER  2,120,020
PRESERVING BAKERY PRODUCTS
Filed Aug. 1, 1935
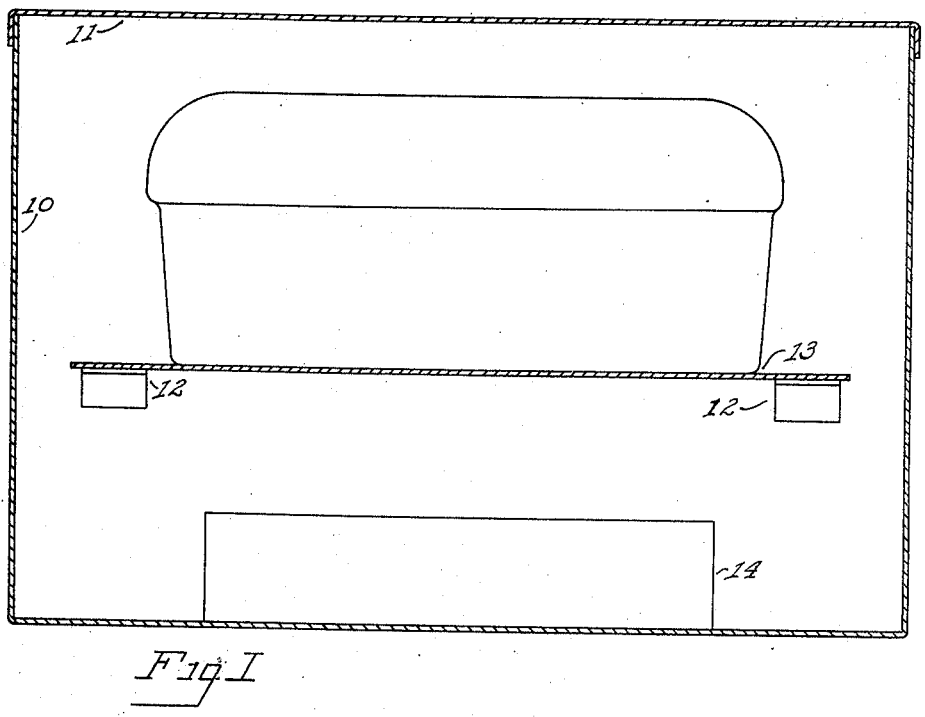
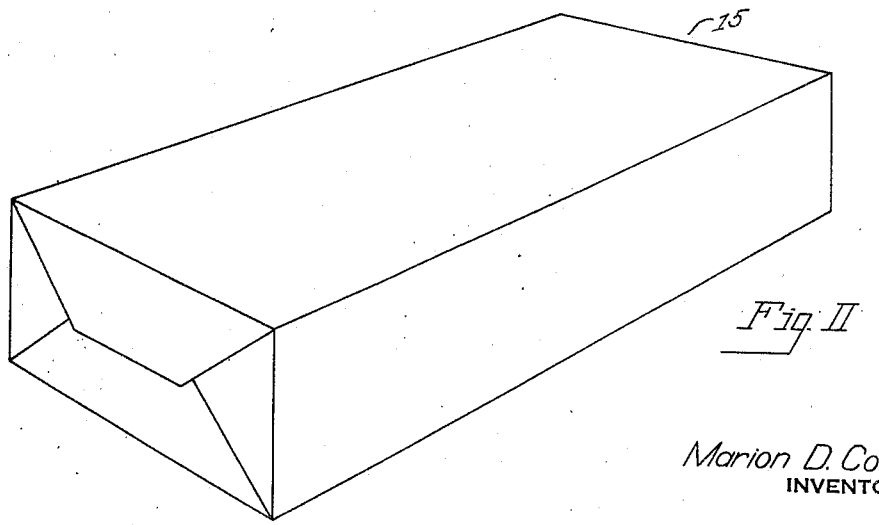
Marion D. Coulter
INVENTOR
BY
Gillson, Mann & Cox
ATTORNEYS

Patented June 7, 1938

2,120,020

UNITED STATES PATENT OFFICE 2,120,020

PRESERVING BAKERY PRODUCTS

Marion D. Coulter, Pittsburgh, Pa., assignor to Toledo Scale Manufacturing Company, a corporation of New Jersey Application August 1, 1935, Serial No. 34,168

6 Claims. (Cl. 167—13)

The invention relates to preserving bakery products and other perishable goods and has for its principal object the preparation of units for treating the atmosphere of a storage cabinet containing a bakery product or the like.

Although research workers have studied the problem of spoilage of bakery products for many years, they have not been able in the past to reduce in any appreciable degree the quantity of bakery products wasted in the United States, amounting to millions of pounds every week. In the production of these products, it has been found impossible to prevent deposition of mold spores, which are universally present in the atmosphere, on the baked goods before they are wrapped.

The common mold spores require from three to seven days for incubation on bread enclosed in a wrapper or box. If, instead of spores, a particle of living mold is deposited on the loaf, active growth starts immediately. Mold does not develop on bread that is unwrapped and left to dry out in the open air, but the drying out of bread in the open air renders it unfit for food at the end of one or two days.

Changes in the condition of bread caused by molding or drying out, unlike the chemical change known as "staling", are not reversible, so that after they have occurred it is impossible to restore the bread to edible condition. No means has been known in the past for treating bread to prevent mold growth, without allowing it to dry out rapidly, or tainting it so much as to render it unsalable.

It has now been found, however, that molding of bakery products, particularly when uncut, can be prevented by the use, in conjunction with the maintenance of certain critical atmospheric conditions in the space where the products are stored, of agencies that have heretofore failed to inhibit such molding. Maintaining these critical atmospheric conditions produces an increased effectiveness of anti-mold agencies that are not capable of tainting bread, and their increased effectiveness is such that they prevent molding. Under normal atmospheric conditions, these agencies are not effective to arrest mold growth.

In order to make effective the anti-mold agency that is employed, atmospheric conditions of temperature or relative humidity or both may be maintained within predetermined limits. Either temperature may be regulated while relative humidity is allowed to rise, or relative humidity may be regulated while temperature is allowed to vary with changes in weather. On the other hand, temperature and relative humidity may both be regulated, when neither needs to be kept as low as if temperature or relative humidity alone were controlled.

The most convenient mold-inhibiting agencies are substances that may be introduced into the atmosphere of the bakery product storage cabinet, which do not taint the products when present in contact with them in effective concentrations. Substances that do not taint the products in effective concentrations are hereinafter called palatable anti-mold agents.

Volatile palatable anti-mold agents are the most easily dispersed into the atmosphere of the storage space, particularly when they can be dissolved in a suitable solvent. One such agent is hydrogen peroxide, which can be obtained commercially as a 30% aqueous solution.

Ammonia when introduced into the atmosphere of the cabinet in a concentration not quite sufficient to taint bakery products is a particularly effective anti-mold agent. When an aqueous solution is used as the source of ammonia, the proportion of ammonia by weight is preferably about .005 or .01%. Concentrations less than .005% have not been found sufficiently effective under ordinary circumstances, while a concentration of .015% may impart an odor of ammonia to the products.

None of the agencies above mentioned has been found entirely satisfactory when used alone for the preservation of bakery products. However, when they are used in conjunction with the maintenance of predetermined critical atmospheric conditions in the storage space, bakery products particularly when uncut are satisfactorily preserved. The vital atmospheric conditions have been found to be temperature and relative humidity. Since the critical temperatures that correspond to various anti-mold agencies are relatively high, a more tempering rather than refrigeration of the atmosphere in the storage space is required. Mold growth flourishes with equal abundance both above and below the critical temperatures corresponding to various anti-mold agencies, when such agencies are not used.

When an aqueous solution of ammonia having an ammonia concentration of .01% is left in contact with the atmosphere of the storage cabinet, and when the relative humidity of that atmosphere is close to 100%, the temperature in the cabinet need only be as low as 75° F., but a temperature of 80° F. has not proved satisfactory. The newly discovered properties of gaseous ammonia when used in the atmosphere of the storage space within a narrow range of concentrations are such that ammonia may be used alone for preservation when a temperature of 75° F. or less prevails. In other cases, it is necessary to provide means for maintaining proper atmospheric conditions.

Successful preservation may also be achieved by use of anti-mold agencies in conjunction with the maintenance of a per cent relative humidity that is below a predetermined critical value. In the majority of cases, a relative humidity of 81% is very satisfactory. Except when this value for relative humidity is used in conjunction with an anti-mold agency, it is of little avail, for a substantial growth of mold can be obtained both above and below 81% relative humidity in the absence of anti-mold agencies.

At 81% relative humidity, the rate at which the common varieties of bread lose water is not great enough to cause the bread to become seriously dried out for about a week. There is tabulated below the weight loss in percentage of the initial weight of samples of four types of bread, during exposure for various periods of time to 81% relative humidity.

| Period of exposure in hours | Loss in percentage of initial weight | | | |
| --- | --- | --- | --- | --- |
| | Cracked wheat | Rye | Home made | Soft bun |
| 20 | 0.2 | 0.8 | 1.4 | 2.0 |
| 43 | 1.3 | 2.0 | 2.6 | 4.0 |
| 67 | 2.1 | 3.1 | 4.1 | 6.1 |
| 92 | 3.2 | 5.1 | 8.4 | 9.0 |
| 116 | 4.6 | 7.9 | 11.6 | 11.6 |
| 163 | 8.2 | 12.0 | 17.0 | 15.0 |

It has been found that hard rolls and Vienna bread can be preserved at a relative humidity as low as 75%, although 81% relative humidity is not high enough to cause softening of their crust. Soft rolls cannot be preserved as long as other products because they dry out more rapidly. Cinnamon rolls, ordinary sweet rolls, cocoanut rolls and cake-batter doughnuts require a relative humidity below 80% in order to prevent their crusts from becoming sticky.

The two preferred palatable anti-mold agents that have been mentioned are soluble in water and are volatile, so that they may be conveniently introduced into the atmosphere of the storage space by use of an aqueous solution. The liquid comprising a volatile anti-mold agent may be an aqueous solution having a substantially constant vapor pressure, preferably in the range seventy-five to eighty-five per cent of the vapor pressure of water. Even when a solution of a volatile anti-mold agent with no other solute is used, a separate aqueous solution having the proper vapor pressure can be employed to maintain the desired relative humidity in the storage space. For this purpose, a sulphuric acid solution of about 25% concentration suffices, if brought into intimate contact with the atmosphere. However, a substantially saturated aqueous solution having a vapor pressure in the range seventy-five to eighty-five per cent of the vapor pressure of water is preferred, and an undissolved excess of solute in contact with the solution prevents it from becoming unsaturated. The relative humidity of air in equilibrium with such a saturated solution is caused to vary only about one per cent by annual variations in temperature occurring in ordinary temperate climates.

Saturated solutions of the following salts have been found satisfactory for maintaining in storage cabinets the relative humidities stated below.

| Salt used in saturated solution | Percent relative humidity at 20° C. |
| --- | --- |
| Sodium acetate $NaC_2H_3O_2.3H_2O$ | 76.0 |
| Sodium thiosulphate $Na_2S_2O_3.5H_2O$ | 78.0 |
| Ammonium chloride $NH_4Cl$ | 79.2 |
| Ammonium sulphate $(NH_4)_2SO_4$ | 81.0 |

Substantially stable ammonium salts of strong mineral acids are preferred because the vapor pressure of their saturated aqueous solutions is best suited to most bakery products. In addition, they appear to act to some extent as mold-inhibiting agents. It is believed that the slight volatization and dissociation of these salts provides ammonia in effective concentrations. Ammonium sulphate is cheaper than ammonium chloride, has a slightly more desirable vapor pressure, and has been found to have a greater inhibiting effect upon the growth of bread mold.

Successful protection of bakery products against mold growth has been attained by use of a solution prepared from ammonium sulphate and hydrogen peroxide. After aqueous solutions of the two compounds have been mixed gradually in a cooled vessel, the resulting solution is relatively stable. It is believed to contain two definite compounds, in one of which a molecule of ammonium sulphate is combined with a molecule of hydrogen peroxide, and in the other of which two molecules of ammonium sulphate are combined with a molecule of hydrogen peroxide.

During an experiment that lasted for 129 hours, the solution prevented mold growth on the exterior of loaves of rye, cracked wheat, home made and soft bun bread stored in an atmosphere exposed thereto. The stability of the preserving solution thus appears to be such that hydrogen peroxide continues to be set free for ten days or more instead of disappearing rapidly as it does in a solution of hydrogen peroxide alone.

The proportions of ammonium sulphate and hydrogen peroxide used in the preserving solution should be such that there is always an undissolved excess of ammonium sulphate. If 139 parts of 30% hydrogen peroxide solution are mixed with a solution of ammonium sulphate containing 103 parts of water, there should be present at least 162 parts of ammonium sulphate. The combining of ammonium sulphate and hydrogen peroxide appears to go on very slowly so that the excess of undissolved ammonium sulphate disappears gradually. When only 162 parts of ammonium sulphate are used with the proportions of other ingredients stated above, the undissolved ammonium sulphate all passes into solution in the course of about 67 hours, and the vapor pressure of the solution then falls below the value that it is desirable to maintain in the storage space in order to prevent rapid drying of the bakery products.

Preserving solutions may also be made up from ammonium sulphate and ammonia, or ammonium sulphate, hydrogen peroxide and ammonia. When ammonium sulphate and ammonia are used, the proportion of ammonium sulphate should be sufficient to saturate the solution, and the ratio of the weight of ammonia to the weight of water should be about .0001 or slightly less. Mold growth on stored bakery products is prevented by solutions in the storage space saturated with ammonium sulphate and containing ammonia and hydrogen peroxide with concentrations of ammonia and hydrogen peroxide varying over a wide range, the ratio of the weight of ammonia to the weight of water being below .00015 in all cases in order that tainting of the products may be avoided. These systems of preservation by means of mold inhibiting agencies are claimed in copending application Serial No. 29,665 filed by Marion D. Coulter on July 3, 1935.

After a loaf of bread is removed from its wrapper by a consumer, the mold spores incubating on the loaf at once become greatly augmented by deposition of spores from the unfiltered air of the home. In an experiment in which a loaf of bread was unwrapped and then replaced inside the wrapper with the opened end of the wrapper folded shut in the usual manner, luxuriant mold growth began to appear at the end of five days. A high relative humidity was maintained inside the wrapper by evaporation of moisture from the bread in this case as in the case of all wrapped bread. Yet the surrounding air was very dry and at a temperature below 75° F. It is thus apparent that bakery products can be preserved far better than by prior practices when treated in accordance with the methods above described, and that there is great need for a device suitable for use in the home to carry out these methods of preserving bakery products.

Although the mold-inhibiting agencies most convenient for domestic use are liquids comprising palatable volatile anti-mold agents, trays of such liquids for domestic bread boxes are awkward to handle and are likely to be spilled frequently. The use of the preserving liquids in the home can be made feasible by rigidification of the liquids into solid units that can be handled in the home with convenience and that obviate all danger of spilling of the liquids.

Rigidification of these and other liquids can be carried out by the addition to them of a relatively small proportion of supporting or rigidifying ingredients. These ingredients may include absorbent material and a quantity of binder that holds the absorbent material in a coherent mass without materially impairing its absorbent properties. The former substance is preferably in the form of particulate material such as granular or earthy matter. Among the suitable materials are various commercial filter aids, and particularly diatomaceous earth which can be obtained as a crude gray or purified white product.

The quantity of binder used is preferably smaller than the quantity of absorbent material, because any increase in the proportion of binder produces some obscure change in the texture of the finished unit, believed to be a clogging of the pores, which causes a loss of part of the liquid by drainage. When plaster of Paris is used as the binder and diatomaceous earth as the absorbent material, it has been found that the ratio by weight of plaster of Paris to diatomaceous earth should be about 1:3.

Whatever the liquid used in the unit, the weight thereof may be substantially greater than the weight of absorbent material, and even greater than the combined weight of the rigidifying ingredients. If the liquid constitutes a solution, it may contain a quantity of solute approximately sufficient to form a saturated solution. Thus there may be a slight undissolved excess of solute, provided for the purpose of keeping the solution saturated, as in the case of the use of a saturated solution having a definite vapor pressure.

There are tabulated below the results of an experiment in which a number of units were made up from ingredients consisting in each case of 15.0 parts of diatomaceous earth, 47.5 parts of ammonium sulphate, 50.0 parts of water, and the number of parts of plaster of Paris stated in the table.

| Parts plaster of Paris | Character of unit |
| --- | --- |
| 1.0 | Heavy drainage. Did not set in two hours. |
| 2.5 | Small drainage loss. Remained soft and lost shape when removed from mold. |
| 4.0 | No drainage. Soft out of mold. Lost shape slightly. |
| 4.5 | No drainage. Held shape. |
| 5.5 | Slight drainage. Held shape. |
| 6.0 | Drainage increased. Set in 140 seconds. |
| 6.5 | Drainage increased. Held shape out of mold. Set almost immediately on pouring into mold. |

The tabulated results show that the use of a proportion of plaster of Paris greater than that recommended causes loss of solution by drainage and undesirably great rapidity of setting. In another experiment several units were made up each containing 15.0 parts of diatomaceous earth, 5.0 parts of plaster of Paris, and the number of parts of water and ammonium sulphate stated in the table below:

| Parts (NH$_4$)$_2$SO$_4$ | Parts H$_2$O | Character of unit |
| --- | --- | --- |
| 30 | 30 | Broke on removal from mold. Set quickly. |
| 35 | 35 | Broke on removal from mold. Set quickly. |
| 40 | 40 | Slightly friable but could be handled. |
| 45 | 45 | Satisfactory. |
| 50 | 50 | Satisfactory. |
| 55 | 55 | Too soft but came from mold without breaking. |
| 60 | 60 | Too soft to handle. |
| 65 | 65 | Too soft to handle. |

Although the time required for setting of the units prepared in this experiment did not vary greatly with varying proportions of solution, the experiment showed how much solution can be used in the unit, and showed that when less than the maximum proportion of solution is used, some ingredients should be included to counteract friability of the unit.

The preferred method of making a unit is carried out by mixing with the preserving liquid to be rigidified any suitable self-setting absorbent material. The material may consist of a mixture comprising an absorbent substance, such as a mixture of absorbent matter with a self-setting binder. The most suitable self-setting binders are cements such as plaster of Paris, gypsum plaster, lime and Portland cement. Since plaster of Paris is a less dense cement than the others, it does not clog up the absorbent material in the unit as much. An undissolved excess of solute, when desired in the unit, may be incorporated with the self-setting material.

When an absorbent particulate material is used, the alternative method may be followed of impregnating the particles with a substantial proportion of liquid and then binding them together into a coherent solid mass.

Employment of either of these two methods makes possible the incorporation of a remarkably large proportion of liquid into a finished unit, although when a brick is made up from comparatively dry materials and then impregnated with liquid, all but a small proportion of the impregnating liquid immediately drains out of the brick. Copending application Serial No. 34,393 filed by Marion D. Coulter on August 2, 1935 relates to the preparation of the units above described.

It has been found that the liquid also drains slowly out of a unit prepared in accordance with either of the suggested methods. Although the drainage is slow enough to provide plenty of time after the preparation of a unit for its transference to a bread cabinet, the drainage from the unit into the bottom of the cabinet is very annoying to a fastidious housewife.

It has been discovered that this slow drainage, unlike the drainage from a brick made up dry and then impregnated, can be prevented. In accordance with the present invention, drainage of liquid from absorbent material such as that composing the units above-described is obviated by incorporation therewith of certain chemicals.

It has also been found that the units of the present invention can be so stabilized that they can be stored and kept in their original condition until they are needed. After a stabilized unit made in accordance with the invention has been unstabilized and placed in a closed bread box, it gives off and absorbs vapors for a month or more to maintain therein the conditions necessary for preservation of bakery products.

The principal object of the invention is thus the preparation of units for treating the atmosphere of a storage cabinet containing a bakery product. More specific objects and advantages are apparent from the description, in which reference is had to the accompanying drawing illustrating units made in accordance with the invention.

Figure I of the drawing is a vertical section of a storage cabinet for preservation of a bakery product by means of a unit made in accordance with the invention.

Figure II illustrates a unit stabilized in accordance with the invention.

This specific drawing and the specific description that follows are to disclose and illustrate the invention and are not to impose limitations upon the claims.

There is shown in Figure I of the drawing a closed cabinet for a bakery product adapted to hold a unit of the type mentioned above. The cabinet may be in the form of a box 10 having an air-tight cover 11, and brackets 12 fixed to the inside wall of the box for supporting a shelf 13. A unit 14 may be placed in the bottom of the box.

The agents that when incorporated with absorbent material prevent drainage of liquid therefrom make up a definite class of substances, which are hereinafter called travel-inhibitors. The members of this class of substances that do not cause excessive frothing during the mixing of the ingredients, and that do not taint bakery products when used in effective proportions in a unit contained in a bakery product cabinet are proper for employment in the units of the present invention. These members of the class of substances known as travel-inhibitors may therefore be termed suitable travel-inhibitors. In the selection of one of these substances for incorporation in a unit, there should be chosen a travel-inhibiator, or a substance that when incorporated in the unit forms a travel-inhibitor, that has the properties necessary to make it suitable for use therein. If the substance used is subject to decomposition, a suitable preservative such as a non-volatile bacteriological poison should be included in the unit.

The substances that act as travel-inhibitors include those that mechanically retard diffusion. In order to prevent rapid outward diffusion of a liquid employed in the unit, a diffusion retarder such as bagasse pith or wood flour may be used. These two substances are among those that are subject to bacteriological decomposition. When the liquid in the unit is a solution, only the diffusion of the solute may need to be retarded, as in the case of ammonium sulphate solution. Then any slimy substance capable of forming diaphragms in the pores of the unit that hold back the solute but permit osmotic diffusion of the solvent may be employed.

When the unit contains a solution of a crystalline solute, substances may also be used as travel-inhibitors that are capable of furnishing nuclei for crystallization inside the unit, because concentration of the crystallization inside the unit obviates contamination of the interior of the cabinet by crystallization outside the unit. The remaining travel-inhibitors that can be used belong to the class of compounds known as crystallization-retarding agents. Like other travel-inhibitors, crystallization-retarding agents have varying degrees of effectiveness, so that two different agents may have to the be used in two different concentrations to give similar results in the units.

The substances known as crystallization-retarding agents include many materials that have pronounced colloidal properties, although some molecularly-soluble substances give very good results. Many of the most suitable of these agents are water-soluble gums. Also certain substances, such as "Diglycol Stearate", that form thin surface films on water are found to act as effective agents when dispersed throughout the liquid by agitation. The agents must be capable of existing in solution or in the dispersed phase without reacting chemically to modify the composition of the liquid in the unit enough to impair its useful properties. Some of the suitable agents are weak fatty acids and oily, waxy, or saponaceous substances. Organic substances of widely different classes are found to give the desired effect.

The following crystallization-retarding agents have been found particularly suitable:

Gum tragacanth
Karaya
Gum arabic
Gum sandarac
Glyceryl bori-borate
"Diglycol Stearate"
Starch derivatives such as dextrine
Cream of tartar.

Although dilute aqueous solutions of some of the above substances support mold growth, the presence of a salt such as ammonium sulphate in contact with dilute solutions thereof prevents growth of mold and makes unnecessary the use of preservatives. Molasses, and soluble salts of casein, such as the sodium, potassium and ammonium salts, are suitable crystallization-retarding agents, although they are subject to bacteriological decomposition. Gelatine and agar decompose more slowly than the casein salts, but must be used in relatively large quantities.

The reason for the effectiveness of crystallization-retarding agents as travel inhibitors is not well understood. It is believed, however, that the results achieved by the employment of these substances are not due to retardation of crystallization alone. Probably the production of a change in the surface tension of the liquid is a materially contributing factor.

Travel-inhibitors are believed to be more effective when they are soluble in the liquid held by the absorbent substance. However, since "Diglycol Stearate", in spite of its low solubility in water, has been found to be quite effective for preventing drainage of a water solution from a unit, it appears that slight solubility of the substance used is just as efficacious as greater solubility. Thus, when it is necessary to prevent drainage of a solution, the travel-inhibitor employed is preferably soluble in a solvent present in the solution.

The travel-inhibitors mentioned above are particularly suitable for preventing the drainage of a solution of a crystalline solute, such as ammonium sulphate. The drainage of such a solution seems to be the most pronounced, and thus the employment of a travel-inhibitor with such a solution the most necessary, when the solution is saturated with the crystalline solute, as in the case of the presence of an undissolved excess of crystalline material. Water solutions have been found to have a marked tendency toward drainage, which is most easily counteracted by a travel-inhibitor that is soluble in water. When the quantity of the water solution is substantially larger than the quantity of absorbent material, as in the case of the units described above, the drainage that takes place in the absence of a travel-inhibitor is especially copious.

In order to prevent substantial drainage from a quantity of diatomaceous earth of a substantially larger quantity of an aqueous solution of a crystalline substance, the quantity of a water-soluble travel-inhibitor employed should in general be more than one-tenth of one per cent of the weight of water. In addition to being large enough to prevent substantial loss of liquid in each case, the quantity of travel-inhibitor used should be small enough so that it does not unduly retard the setting of the binder when a binder is present in the unit. Thus, when it is desired to prevent drainage of a water solution of a crystalline substance from diatomaceous earth to be cemented into a coherent mass, a quantity of a water-soluble travel-inhibitor should generally be used that is less than one-half of one per cent of the total weight of the mass. The preferred quantity of gum tragacanth to be used in such a case is, for example, about three-tenths of one per cent of the weight of water.

Very satisfactory units have been prepared from ingredients in the proportions by weight stated below:

| | Parts |
|---|---|
| Diatomaceous earth | 55 |
| Ammonium sulphate | 140 |
| Water | 180 |
| 2% aqueous solution of gum tragacanth | 30 |
| Plaster of Paris | 20 |

In this formula, the weight of the solid ingredients used to rigidify the liquid is only a little over one-fifth of the weight of liquid. The formula provides only a slight excess of ammonium sulphate over the amount required for a saturated solution, so that a unit made in accordance with the formula is suitable for use in a cabinet that is opened frequently. A unit of this composition, however, should not be employed if there is any likelihood that during the use of the unit its water content may become greater than when the unit was made. If there is such a likelihood, the weight of the ammonium sulphate should be increased until it is nearly equal to that of the water used in the unit, to provide an excess of ammonium sulphate over the amount required for a saturated solution.

With such an excess of the salt, the unit is suitable for use in a bread storage cabinet that may be left closed for comparatively long periods of time, because such a unit is capable of absorbing moisture from bakery products in a closed cabinet for a longer period of time than the cabinet is ever likely to remain closed, before the ammonium sulphate solution can become unsaturated. Thus, since the solution does not become unsaturated during the ordinary use of the unit, the relative humidity in the cabinet cannot rise above 81% during any period for which the cabinet remains closed.

After the above ingredients have been mixed thoroughly, it requires about five minutes for them to set into a unit firm enough for removal from a mold. An advantageous reduction in the rate of setting of the unit is usually effected by the incorporation of a travel-inhibitor. When a further reduction in the rate of setting is desired in order to provide plenty of time for careful preparation of the units, large batches of material may be mixed up at one time, and the proportion of travel-inhibitor may be slightly increased.

For a unit having a volume of about 80 cubic inches, which is large enough for a cabinet holding four loaves of bread, the total weight of ingredients used should be about 400 grams. The proportion of plaster of Paris may be reduced about 8% from that stated in the formula when a 100-gram unit is prepared, without the production of any softness in the smaller unit.

Reduction of the weight of plaster of Paris used for small units to about one-third the weight of diatomaceous earth is shown to be desirable by the data tabulated at the beginning of the specification. In the experiments in which these data were recorded, units weighing only about 100 grams each were prepared. Further experiments have shown that the proportion of plaster of Paris stated in the formula is preferable for the larger units. There are tabulated below the results of an experiment in which a number of units were made up from ingredients in proportions that were the same as in the formula, except that instead of 20 parts of plaster of Paris, the proportion of plaster of Paris stated in the table was used for each unit. After preparation, the units were simultaneously placed in a cabinet in which a relative humidity of 81% was continuously maintained. The weight loss of the samples in percentage of the initial weight, during exposure in the cabinet for various periods of days, is stated in the table, together with the initial weight of each sample in grams.

| Grams initial weight | Parts plaster of Paris | Loss in percentage of initial weight | | | | | | | | | |
|---|---|---|---|---|---|---|---|---|---|---|---|
| | | 1 day | 2 days | 3 days | 4 days | 5 days | 6 days | 7 days | 8 days | 9 days | 10 days | 38 days |
| 359 | 22 | 0.98 | 1.7 | 2.5 | 3.6 | 4.5 | 5.0 | 5.3 | 5.9 | 6.1 | 6.3 | |
| 397 | 21 | 0.88 | 1.5 | 1.9 | 2.5 | 3.0 | 3.5 | 4.0 | 4.5 | 4.9 | 5.3 | |
| 402.5 | 20 | 0.50 | 0.9 | 1.6 | 2.2 | 2.7 | 3.4 | 3.9 | 4.4 | 4.9 | 5.1 | |
| 377 | 19 | 0.53 | 1.1 | 1.7 | 2.5 | 3.1 | 3.7 | 4.2 | 4.8 | 5.0 | 5.4 | 7.2 |
| 381.5 | 18 | 0.66 | 1.2 | 1.8 | 2.4 | 3.0 | 3.8 | 4.2 | 4.7 | 5.1 | 5.5 | |
| 384 | 17 | 0.78 | 1.6 | 2.1 | 2.6 | 3.1 | 3.9 | 4.7 | 5.2 | 5.7 | 6.3 | |
| 368.5 | 16 | 1.10 | 2.0 | 3.0 | 3.9 | 4.6 | 5.6 | 6.2 | 6.7 | 6.8 | 6.9 | |

The units prepared in the experiment varied from soft to very rigid. The results indicate that from 18 to 21 parts of plaster of Paris may be used in order that a unit may be obtained that is sufficiently firm to withstand handling and otherwise satisfactory. With greater or smaller amounts of binder, the rate of loss of moisture increases, probably on account of drainage of some of the liquid from the unit.

Anti-mold agents, such as hydrogen peroxide and ammonia, may be incorporated with the ammonium sulphate solution in the unit in the manner described at the beginning of the specification.

The preferred method of making the units of the present invention is carried out by preparing a self-setting absorbent mixture containing a suitable travel-inhibitor and a substantial proportion of liquid, in the manner that has been described. More specifically, the method comprises impregnation of an absorbent substance with a liquid and a suitable travel-inhibitor, followed by binding of the substance into a coherent mass.

When the absorbent material is to hold a solution of a crystalline substance in a solvent in which the travel-inhibitor is soluble, the travel-inhibitor is preferably incorporated with the material before the crystalline substance. In the finished unit, the travel-inhibitor is preferably distributed evenly throughout the mass. It has been found that an even dispersion thereof throughout the mass may be obtained by adding the travel-inhibitor in the form of a solution. It may be dissolved in a small proportion of liquid, or in a considerable proportion of the liquid to be held by the absorbent material. Since the travel-inhibitor is likely to be salted out of its solution upon the addition of a crystalline solute, the solution thereof should be prepared before any crystalline material is dissolved in the solvent to be used for the travel-inhibitor. Thus, the travel-inhibitor either in the form of a solution or in the form of a powder may be dispersed throughout the absorbent mass before the crystalline substance or a solution thereof is incorporated therewith.

In order to prepare a solution, such as a saturated solution of a crystalline substance, for incorporation in the absorbent mass, it is quite advantageous to dissolve in the solvent at a suitable temperature an amount of the solute that is in excess of the amount that dissolves in the solvent at ordinary temperatures. A solution so prepared can be filtered while it is at a temperature at which all the solute is dissolved, and in addition, the solution is certain to be saturated after the unit has been cast. If the solution is allowed to stand so that part of the solid material precipitates, the precipitate is very fine and settles slowly, so that it is very easily mixed with the other ingredients at the same time as the solution. An ammonium sulphate solution, when used in making up the unit, can be prepared by heating the salt with the water until the increased solubility is such that all of the salt dissolves.

It has been found that in all cases, during the casting of the unit, a slight amount of the contained liquid may drain into the bottom of the mold. Thus it is advantageous to use a mold having a perforated bottom in order to prevent the finished unit from having an undesirably soft lower portion.

Thus, when the unit is made in accordance with the formula stated above, the preferred procedure is to mix the diatomaceous earth and plaster of Paris, to incorporate the gum tragacanth in intimate mixture with the dry materials, to dissolve the ammonium sulphate in the water by use of heat, to filter the hot solution, and then to add the solid ingredients to the solution with stirring. After about three minutes of stirring, the mixture is stiff enough so that it can be poured into a mold having a bottom formed of copper screen or other suitable perforate material. When the mold is made of wood, and preferably also when it is made of steel, it should be lubricated to prevent sticking of the unit.

It has been discovered that when the units are wrapped in one of the many varieties of moisture-proof foil on the market, such as "Cellophane" or "Kodapak", the foil does not cause any deposition of salt on the exterior of the units, and is not attacked by the ammonium sulphate used in the preferred form of unit. The stabilized unit 15 illustrated in Figure II is preferably prepared after the cast mixture has cooled, because units wrapped while warm develop a slight odor that requires a few minutes after opening of the stabilized unit for its disappearance. Experiments have shown that units stabilized according to the invention remain in their original condition for an indefinite period of time, so that they can be kept in storage until it is desired to use them. After the foil has been removed and the unit placed in a closed cabinet, it at once begins to give off and absorb vapors, so that the exact atmospheric conditions necessary for preservation of bakery products are maintained.

The substance of the invention may be utilized in making up units in various ways to meet various requirements.

I claim as my invention:

1. A unit for treating the atmosphere of a storage cabinet that comprises 55 parts by weight of diatomaceous earth, holding 140 parts of ammonium sulphate, 210 parts of water, and 0.6 part of gum tragacanth, and cemented into a coherent mass by means of 20 parts of plaster of Paris.

2. A unit for treating the atmosphere of a storage cabinet that comprises an absorbent particulate substance, a substantial proportion of water held thereby for treating said atmosphere, a suitable travel-inhibitor to prevent loss of water from the unit, and cement binding the whole into a coherent mass.

3. A unit for treating the atmosphere of a storage cabinet that comprises an absorbent particulate substance, a water solution held thereby, an evenly distributed quantity of suitable travel-inhibitor large enough to prevent substantial loss of solution from the unit, and a cement binding the whole into a coherent mass.

4. A unit for treating the atmosphere of a storage cabinet comprising absorbent particulate material impregnated with a water solution of a crystalline substance, a suitable water-soluble crystallization retarding agent, and a cement binding the whole into a coherent mass.

5. A unit for treating the atmosphere of a storage cabinet comprising diatomaceous earth, a water solution of a crystalline substance held thereby, plaster of Paris, a quantity of suitable water-soluble crystallization retarding agent whose weight is less than about one-half of one per cent of the weight of the mass, but sufficient to prevent substantial loss of solution from the unit.

6. A unit for treating the atmosphere of a storage cabinet comprising a quantity of diatomaceous earth impregnated with a substantially larger quantity of a water solution of a crystalline substance, a cement, and a quantity of suitable water soluble travel inhibitor whose weight is more than about one-tenth of one per cent of the weight of water, but insufficient to retard substantially the setting of the cement.

MARION D. COULTER.